(12) United States Patent
Shahin

(10) Patent No.: US 11,338,615 B2
(45) Date of Patent: May 24, 2022

(54) WHEEL DISC BRAKE ASSEMBLY

(71) Applicant: MANDO CORPORATION, Pyeongtaek-si (KR)

(72) Inventor: Hatem Shahin, Pfaffenhofen (DE)

(73) Assignee: MANDO CORPORATION, Pyeongtaek-si (KR)

( * ) Notice: Subject to any disclaimer, the term of this patent is extended or adjusted under 35 U.S.C. 154(b) by 282 days.

(21) Appl. No.: 16/697,649

(22) Filed: Nov. 27, 2019

(65) Prior Publication Data

US 2020/0171879 A1  Jun. 4, 2020

(30) Foreign Application Priority Data

Nov. 30, 2018  (DE) .................. 102018220765.8

(51) Int. Cl.
*B60T 1/06* (2006.01)
*B60B 21/08* (2006.01)
(Continued)

(52) U.S. Cl.
CPC .............. *B60B 21/08* (2013.01); *B60T 1/065* (2013.01); *F16D 55/225* (2013.01); *F16D 65/123* (2013.01); *F16D 65/125* (2013.01); *F16D 65/127* (2013.01); *F16D 69/021* (2013.01); *F16D 69/027* (2013.01); *B60B 2360/10* (2013.01); *B60B 2360/102* (2013.01); *B60B 2360/104* (2013.01); *B60B 2900/112* (2013.01); *B60B 2900/131* (2013.01); *B60B 2900/133* (2013.01); *F16D 2065/132* (2013.01); *F16D 2065/138* (2013.01); *F16D 2065/1328* (2013.01); *F16D 2065/1336* (2013.01); *F16D 2200/003* (2013.01); *F16D 2200/0013* (2013.01); *F16D 2200/0021* (2013.01); *F16D 2200/0026* (2013.01); *F16D 2200/0034* (2013.01)

(58) Field of Classification Search
CPC ....... B64C 25/405; B60T 1/067; F16D 55/22; F16D 65/10; F16D 65/12; F16D 65/123–128
USPC ................ 188/18 A, 218 A, 218 XL, 264 A, 188/264 AA
See application file for complete search history.

(56) References Cited

U.S. PATENT DOCUMENTS 4,159,832 A  7/1979  Inbody
5,732,798 A  3/1998  Toson
(Continued)

FOREIGN PATENT DOCUMENTS

DE  102011122041 A1 *  8/2012  ............. F16D 55/22
EP  2955109 A1 *  12/2015  ........... B64C 25/405

*Primary Examiner* — Christopher P Schwartz
(74) *Attorney, Agent, or Firm* — Hauptman Ham, LLP

(57) ABSTRACT

The invention at hand refers to a wheel disc brake assembly comprising a wheel rim, a coupler ring and an annular brake disc arranged in a concentric manner, wherein an outer surface of the coupler ring is connected to an inner surface of the wheel rim and an inner surface of the coupler ring is connected to an outer surface of the annular brake disc. The wheel disc brake assembly further comprises a caliper with at least two brake pads facing each other, wherein the caliper surrounds at least a part of the inner surface of the annular brake disc and the at least two brake pads are configured to press against opposite side faces of the annular brake disc.

10 Claims, 4 Drawing Sheets

(51) Int. Cl.
    *F16D 65/12*     (2006.01)
    *F16D 55/225*     (2006.01)
    *F16D 69/02*     (2006.01)
    *F16D 65/02*     (2006.01)

(56) References Cited

U.S. PATENT DOCUMENTS

| | | | |
|---|---|---|---|
| 8,840,193 B2 * | 9/2014 | Schmidt | B60B 27/0031 |
| | | | 301/6.8 |
| 2010/0176651 A1 * | 7/2010 | Thomas | F16D 55/22 |
| | | | 301/6.8 |
| 2012/0255820 A1 * | 10/2012 | McCord | F16D 65/12 |
| | | | 188/218 XL |
| 2016/0025167 A1 * | 1/2016 | Broda | F16D 65/127 |
| | | | 188/218 XL |
| 2020/0172057 A1 * | 6/2020 | Shahin | B60T 1/067 |

* cited by examiner

WHEEL DISC BRAKE ASSEMBLY

CROSS REFERENCE TO RELATED APPLICATION

This application claims priority under 35 U.S.C. § 119 to German Patent Application No. 102018220765.8, filed on Nov. 30, 2018 in the German Patent and Trade Mark Office (DPMA), the contents of which are herein incorporated by reference in their entirety

TECHNICAL FIELD

The present invention relates to a wheel disc brake assembly with a large friction radius.

BACKGROUND

Disc brake systems typically comprise at least one brake disc fixed centrally to the wheel hub and a caliper with two brake pads facing each other. Thereby, the caliper surrounds a part of an outer surface of the brake disc. Pressing the brake pads against the two side faces of the brake disc causes the wheel to decelerate.

However, fixing the brake disc to the wheel hub creates unnecessary rotational mass and increases the out-of-plane-mode events deteriorating noise, vibration and harshness (NVH) behaviour. It is thus desirable to reduce the mass of the wheel disc brake assembly as much as possible without adversely affecting its mechanical stability.

A further objective is to maximize the friction radius in order to reduce the clamping force. Theoretically, the friction radius could be almost as large as the radius of the wheel rim. Practically, the friction radius is limited by the size of the caliper, which is arranged between the wheel and the brake disc and provides space for the braking pads and hydraulic pistons.

A disc brake system with a large friction radius is shown in U.S. Pat. No. 8,840,193 B2, where the brake disc has an annular shape and the caliper is arranged around the inner circumference of the brake disc. Since the brake disc is not directly fixed to the wheel hub, the coupling mechanism by which the brake disc is connected to the wheel involves additional parts and attaching means. However, the latter can lead to unwanted noise and unbalanced braking behaviour, which should be avoided.

SUMMARY

Thus, the object of the invention at hand is to provide a simple and cost efficient design for a wheel disc brake assembly with a large friction radius and high standards regarding noise resilience and durability.

This object of the invention is achieved by the wheel disc brake assembly as described in claim 1. Advantageous developments and embodiments are described in the dependent claims.

A wheel disc brake assembly comprises a wheel rim, a coupler ring and an annular brake disc arranged in a concentric manner, wherein an outer surface of the coupler ring is connected to an inner surface of the wheel rim and an inner surface of the coupler ring is connected to an outer surface of the annular brake disc. The wheel disc brake assembly further comprises a caliper with at least two brake pads facing each other, wherein the caliper surrounds at least a part of the inner circumference of the annular brake disc and the at least two brake pads are configured to press against opposite side faces of the annular brake disc.

The proposed design allows to realize a large friction radius and integrates the annular brake disc and the wheel rim in a simple, stable and noise resilient way by means of the coupler ring. In particular, fixing the annular brake disc via the coupler ring at an inner surface of the wheel rim suppresses unwanted axial movement, drag torque and conning of the annular brake disc caused by thermal load by breaking. Another advantage offered by the invention is to reduce costs, fuel consumption and $CO_2$ emission of a vehicle. A further advantage is efficient dissipation of the various parts of the wheel disc brake assembly, Another advantage is that all components of the proposed wheel disc brake assembly are easy to clean, e.g., in order to avoid brake dust. The proposed design further allows to use light weight calipers, improves axial stiffness and NVH behaviour.

Preferably, the outer surface of the coupler ring with a normal vector pointing in a radial direction of the coupler ring is connected to the inner surface of the wheel rim in a planar manner. This adds mechanical stability to the whole structure and allows to rigidly connect the brake disc to the wheel rim via the coupler ring. Additionally, integrating the wheel rim and the annular bake disc via the coupler ring helps to damp road vibrations through the wheel rubber.

In order to connect the wheel rim, the coupler ring and the annular brake disc, various attaching means can be utilized such as at least one bolt, press fit, welding or adhesive bonding or any combination thereof. In general, it is advantageous if as less components as possible are involved in the connection mechanism. For example, the coupler ring can be connected to the wheel rim and the annular brake disc through bolts only.

Preferably, the annular brake disc is fixed to the wheel rim only via the coupler ring, which is connected to an inner surface of the wheel rim.

This allows changing, i.e., assembling and disassembling, the various parts of the wheel disc brake assembly in a simple manner. Additionally, the annular brake disc may be coupled to a spoke that is detachable from the wheel rim. This may add further mechanical stability to the whole structure of the wheel disc brake assembly. Alternatively, the annular brake disc may completely replace one or multiple spokes of the wheel.

In order to reduce the operating temperature of the wheel disc brake assembly sufficient means for heat conduction and dissipation need to be provided. This can be achieved by a suitable choice of materials, as well as dimensional and geometrical considerations for the wheel rim, the coupler ring and the annular brake disc, as outlined in more detail below.

Preferably, the coupler ring is made of a thermally insulating material, e.g., a ceramic or a polymer material. The coupler ring can also be made of a metal or a metal alloy with low thermal conductivity, preferably a metal or metal alloy with a thermal conductivity that is smaller than the thermal conductivity of aluminium. Choosing a thermally insulating material for the coupler ring prevents that the temperature of the wheel rim increases considerably when the brake pads engage with the brake disc and enormous amounts of heat are produced by friction. Otherwise, an increased wheel rim temperature may increase the tire pressure, which in turn can deteriorate driving performance especially during high performance driving such as car or motorbike racing.

Preferably, the coupler ring is also elastically deformable in order to provide a damping mechanism that compensates for deformations of the tires and/or wheel rim under rough driving conditions.

In some embodiments, the coupler ring can also be made of a thermally conducting material in order to facilitate an efficient heat transfer from the annular brake disc to the wheel rim. Heat generated by friction can generate porosity and defects such as cracks inside the annular brake disc as well as at its surface. Such defects can impact the braking behaviour and harm the durability of the annular brake disc. Providing means for transferring heat from the brake disc to the wheel rim makes it possible to counteract such disc fatigue problems.

In general, it is desirable to reduce the weight of the wheel disc brake assembly in order to reduce on fuel consumption and $CO_2$ emission. Preferably, the wheel rim as well as the annular brake disc are made of aluminium, an aluminium alloy, cast iron, stainless steel or a combination thereof.

The annular brake disc or at least parts of the annular brake disc can also be made of a suitable friction material, which increases friction between the annular brake disc and the brake pads. Such a friction material can be applied as a coating layer on both side faces of the annular brake disc, which engage with the brake pads. The friction material may comprise steel, iron, copper, adhesive materials, asbestos materials or non-asbestos organics, aluminium, stainless steel or another metallic composite, oxide, carbide or combinations thereof. The friction coating layer can be disposed using various methods such as spraying or chemical vapour deposition.

The dimensions of the coupler ring should be chosen such as to provide a stable connection between the wheel rim and the annular brake disc. The radial thickness of the coupler ring is preferably less than 40 mm, more preferably less than 20 mm. The width of the coupler ring is preferably less than 60 mm, more preferably less than 40 mm.

The outer radius of the annular brake disc is limited by the inner radius of the coupler ring. The inner radius of the annular brake disc is limited by the size of the caliper. A large radial thickness increases the surface area and the volume of the brake disc, thereby improving heat conduction and heat radiation.

However, a small radial thickness of the brake disc reduces weight and thereby contributes to fuel and $CO_2$ efficiency.

Preferably, the radial thickness of the annular brake disc should be less than 70 percent of the inner radius of the wheel rim, preferably less than 60 percent of the inner radius of the wheel rim, more preferably less than 50 percent of the inner radius of the wheel rim. The width of the annular brake disc is typically less than 50 mm, preferably less than 30 mm, more preferably less than 25 mm.

Typically, the annular brake disc is arranged in a vertical plane perpendicular to the rotation axis and the width of the annular brake disc does not vary in the radial direction.

In some embodiments, it can be advantageous if the width of the annular brake disc changes in a radial direction. For example, a cross sectional area of the annular brake disc can be in the shape of an isosceles trapezoid. In this case, the forces acting on the annular brake disc are still distributed symmetrically on both side faces of the annular brake disc avoiding out-of-plane-mode events and improving NVH behaviour. One advantage of the proposed geometry is that the outer surface area of the annular brake disc can be increased without further increasing the radial thickness of the annular brake disc. An enlarged braking surface improves heat conduction and thereby suppresses brake fade and disk fatigue problems. Furthermore, the proposed geometry can help to compensate for undesired deformations of the caliper since a tilting of the side faces of the annular brake disc with respect to the plane of rotation generates a better distribution of the pressure exerted by the brake pads on the annular brake disc and vice versa. Preferably, the tilting angle between the side faces of the annular brake disc and the plane of rotation of the wheel rim is between 1 degree and 1.5 degrees.

In another embodiment, the annular brake disc can comprise at least two parallel annular discs with a common rotation axis, wherein the at least two parallel annular discs are spaced apart from one another and are connected by intermediate bridges and said intermediate bridges are arranged such as to let air circulate between the at least two parallel annular discs. Such a configuration guarantees that heat generated by friction can quickly dissipate and be carried away by the air flow around and between the at least two annular discs and intermediate bridges, respectively.

In order to improve reaction time and moment of the brake system, the intermediate bridges can provide additional elasticity for the annular brake disc. This is important for flawless functioning of the brake system in case of multiple braking events occurring in quick succession.

Preferably, the wheel rim, the coupler ring and the annular brake disc are arranged symmetrically with respect to each other such that the centroid of the coupler ring corresponds to the centroid of the annular brake disc and/or the centroid of the annular brake disc corresponds to the centroid of the wheel rim. Such an alignment helps to equally distribute the various forces acting during braking and improves the overall stability as well as NVH behaviour.

The caliper can be placed at any angular position along the inner circumference of the annular brake disc. In order to provide simple means for maintenance and cleaning of the wheel disc brake assembly, the caliper is preferably arranged with maximal distance from the point of contact between the wheel and the ground. It is also possible that the wheel disc brake assembly comprises a plurality of calipers with a plurality of breaking pads in order to increase the clamping force and effective braking surface.

The wheel disc brake assembly proposed by the invention at hand is suitable for various kinds of vehicles ranging from automobiles, motorbikes, buses and trucks to agricultural machinery and aircrafts.

Exemplary embodiments of the invention are illustrated in the drawings and will be explained below with reference to FIGS. 1 to 3.

DETAILED DESCRIPTIONS

Figure 1:
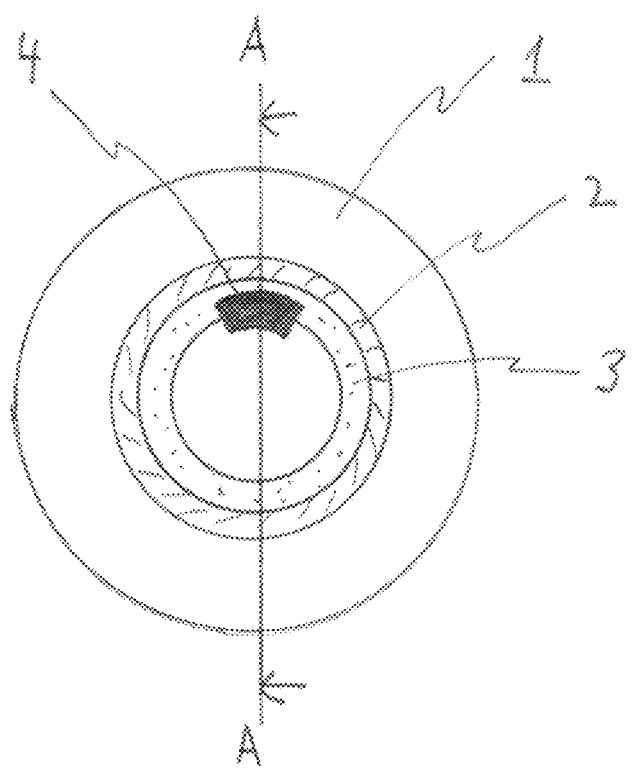
FIG. 1 shows a schematic side view of the wheel disc brake assembly.

FIG. 1 shows a schematic side view of a wheel disc brake assembly comprising a wheel rim 1, a coupler ring 2 and an annular brake disc 3 arranged in a concentric manner. The caliper 4 surrounds a part of the inner circumference of the annular brake disc 3 and is arranged with maximal distance to ground.

An outer surface of the coupler ring 2 with a normal vector pointing in a radial direction connects to an inner surface of the wheel rim 1 in a planar manner.

An outer surface of the annular brake disc 3 with a normal vector pointing in a radial direction connects to an inner surface of the coupler ring 2, i.e. the inner surfaces are directed towards the respective centroid while the outer surfaces are directed away the respective centroid.

The wheel rim 1 as well as the annular brake disc 3 are made of aluminium taking advantage of its low mass and high thermal conductivity, which improves heat dissipation and avoids conning and hot spots. The coupler ring 2 is made of an elastic polymer, which provides thermal insulation for the wheel rim 1. The wheel rim 1 and the annular brake disc 3 are connected through the coupler ring 2 via bolts. The connection between the coupler ring 2 and the annular brake disc 3 or between the coupler ring 2 and the wheel rim 1 may alternatively or additionally be realized by a press fit, welding or adhesive bonding. The braking surfaces of the annular brake disc 3, which are a part of the side faces of the annular brake disc 3, comprise a friction material applied as a coating layer made of a metallic composite with good adhesion to aluminium such as a stainless steel composite.

The radial thickness of the coupler ring 2 is in the depicted embodiment between 10 mm and 30 mm. The width of the coupler ring 2 is less than 40 mm. The radial thickness of the annular brake disc 3 is between 30 percent and 50 percent of the inner radius of the wheel rim 1, The width of the annular brake disc 3 is constant in the radial direction and between 10 mm and 25 mm. All three concentric components, i.e., the wheel rim 1, the coupler ring 2 and the annular brake disc 3 are arranged symmetrically and share a common centroid.

Figure 2:
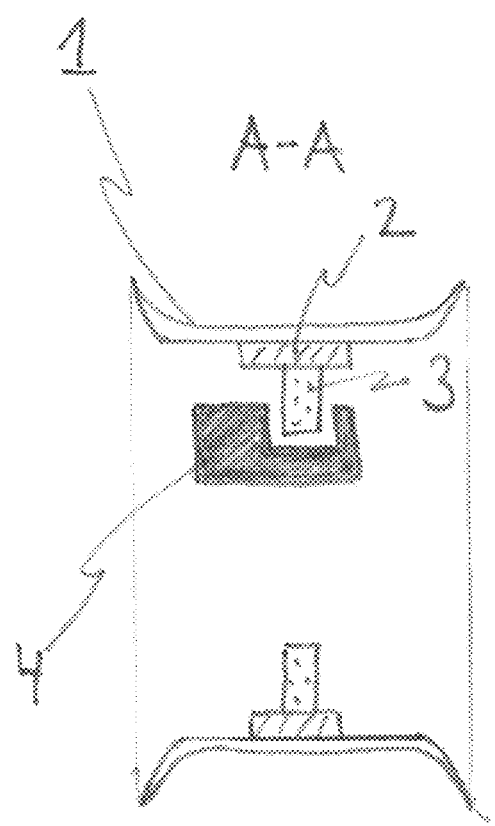
FIG. 2 shows a schematic cross section of the wheel disc brake assembly along the line A-A in FIG. 1.

A cross sectional view of the wheel disc brake assembly along line A-A in FIG. 1 is shown in FIG. 2, where the annular brake disc 3 features a constant width along the radial direction and the caliper 4 surrounds a part of the inner circumference or inner surface (pointing towards the center of the wheel rim 1) of the annular brake disc 3. Recurring features in this figure and the following figures in each case are denoted with identical reference signs. In particular, the caliper 4 is arranged at the upper part of the annular brake disc 3 with maximal distance to ground. The caliper 4 comprises a recess in which the annular brake disc 3 is guided. Two brake pads arranged on opposite side faces of the annular brake disc 3 are configured to move towards each other and press against the annular brake disc 3 for braking. In FIG. 2, the two side faces of the annular brake disc 3 have a normal vector that is parallel to the rotation axis of the wheel rim 1 and the annular brake disc 3.

Figure 3A:
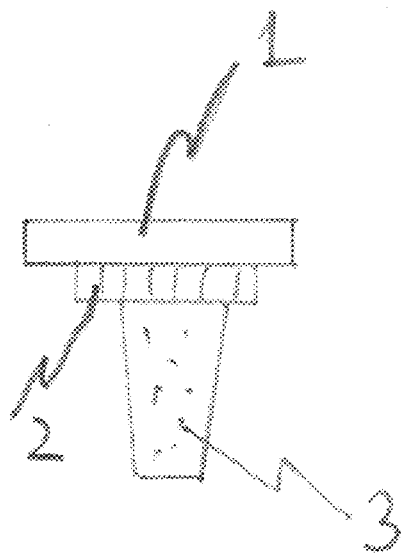
FIGS. 3A-3D show four different geometries of a schematic cross section of the annular brake disc along the line A-A in FIG. 1.
Figure 3B:
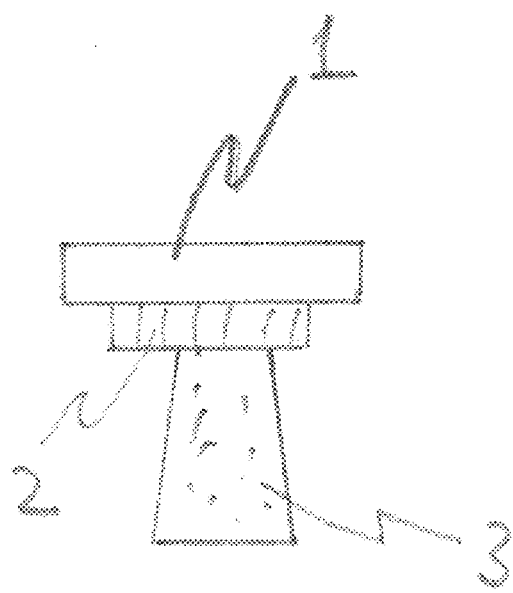

Different geometries for a cross section of the annular brake disc 3 along line A-A in FIG. 1 are shown in FIGS. 3A-3D, In FIG. 3A, the width of the annular brake disc 3 decreases in the radial direction of the centroid. Alternatively, the width of the annular brake disc 3 can also increase in the radial direction of the centroid as shown in FIG. 3B. In FIG. 3A and in FIG. 38 the cross section of the annular brake disc 3 is in the shape of an isosceles trapezoid.

Figure 3C:
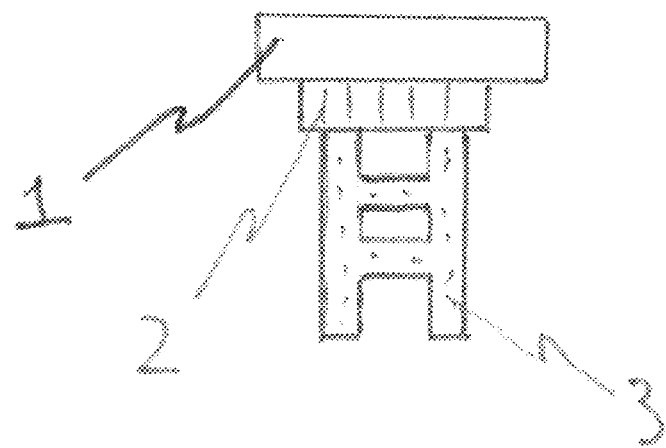
Figure 3D:
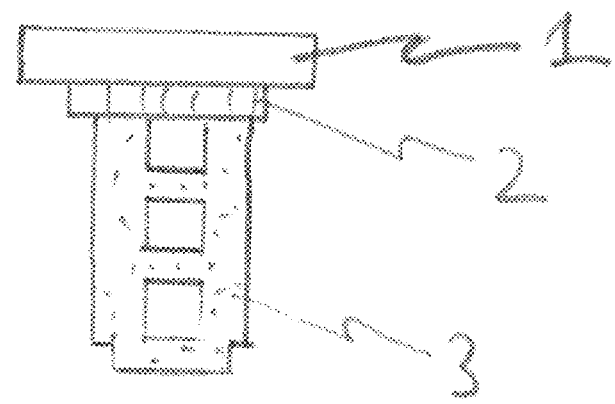

In order to provide additional cooling channels, the annular brake disc 3 can also comprise two annular discs connected by intermediate bridges as shown in FIG. 3C and FIG. 3D. FIG. 3C shows a cross section, where the two annular discs are arranged in parallel and spaced apart from one another. Both annular discs have a constant width along the radial direction and are connected via intermediate bridges with air-filled gaps in between. The inner surfaces of both annular discs with a normal vector pointing in a radial direction are not directly connected such that air can flow in a radial direction from the wheel hub into the space between both annular discs. Such an open ended structure provides an additional channel for air flow and cooling.

Alternatively, the inner surfaces of both annular discs with a normal vector pointing in a radial direction can also be directly connected as shown in FIG. 3D, where the space between both annular discs is closed in both radial directions. In this case, air can only flow in concentric circles through the annular brake disc 3, Such a closed structure provides an additional surface for heat conduction and radiation.

Features of the different embodiments which are merely disclosed in the exemplary embodiments as a matter of course can be combined with one another and can also be claimed individually.

What is claimed is:

1. A wheel disc brake assembly comprising:
   a wheel rim, a coupler ring and an annular brake disc arranged in a concentric manner, wherein an outer surface of the coupler ring is connected to an inner surface of the wheel rim and an inner surface of the coupler ring is connected to an outer surface of the annular brake disc, and
   a disc brake caliper with at least two brake pads facing each other, wherein the disc brake caliper surrounds at least a part of an inner circumference of the annular brake disc and the at least two brake pads are configured to press against opposite side faces of the annular brake disc,
   wherein the coupler ring is made of a thermally insulating material and an elastically deformable material.

2. Wheel disc brake assembly according to claim 1, characterized in that the outer surface of the coupler ring with a normal vector pointing in a radial direction of the coupler ring is connected to the inner surface of the wheel rim in a planar manner.

3. Wheel disc brake assembly according to claim 1, characterized in that the coupler ring is connected to the wheel rim and/or the annular brake disc via at least one bolt, press fit, welding or adhesive bonding.

4. Wheel disc brake assembly according to claim 1, characterized in that the annular brake disc is coupled to a spoke detachable from the wheel rim.

5. Wheel disc brake assembly according to claim 1, characterized in that the wheel rim and/or the annular brake disc comprises aluminium and/or cast iron and/or stainless steel.

6. Wheel disc brake assembly according to claim 1, characterized in that a friction material coating is applied to at least a part of the annular brake disc comprising at least one selected from the group consisting of steel, iron, copper, adhesive materials, asbestos materials and non-asbestos organics.

7. Wheel disc brake assembly according to claim 1, characterized in that
   the radial thickness of the annular brake disc is less than 70 percent of the inner radius of the wheel rim, and/or
   the width of the annular brake disc is less than 50 mm.

8. Wheel disc brake assembly according to claim 1, characterized in that
   across sectional area of the annular brake disc is an isosceles trapezoid.

9. Wheel disc brake assembly according to claim 1, characterized in that the annular brake disc comprises at least two parallel annular discs with a common rotation axis, wherein the at least two parallel annular discs are spaced apart from one another and are connected by intermediate bridges and said intermediate bridges are arranged such as to let air circulate between the at least two parallel annular discs.

10. Wheel disc brake assembly according to claim 1, characterized in that the centroid of the coupler ring corresponds to the centroid of the annular brake disc and/or the centroid of the annular brake disc corresponds to the centroid of the wheel rim.

\* \* \* \* \*